US011161569B2

(12) United States Patent
Inoue et al.

(10) Patent No.: US 11,161,569 B2
(45) Date of Patent: Nov. 2, 2021

(54) BICYCLE FRONT DERAILLEUR

(71) Applicant: Shimano Inc., Osaka (JP)

(72) Inventors: Kenkichi Inoue, Osaka (JP); Kohei Obuchi, Osaka (JP); Mineho Masuda, Osaka (JP)

(73) Assignee: Shimano Inc., Osaka (JP)

( * ) Notice: Subject to any disclaimer, the term of this patent is extended or adjusted under 35 U.S.C. 154(b) by 569 days.

(21) Appl. No.: 15/897,507

(22) Filed: Feb. 15, 2018

(65) Prior Publication Data
US 2018/0265170 A1  Sep. 20, 2018

(30) Foreign Application Priority Data

Mar. 16, 2017  (JP) .............................. JP2017-051602

(51) Int. Cl.
| B62M 9/135 | (2010.01) |
| B62K 19/34 | (2006.01) |
| B62M 9/131 | (2010.01) |
| B62M 9/1342 | (2010.01) |
| B62M 9/136 | (2010.01) |

(52) U.S. Cl.
CPC ............. *B62M 9/135* (2013.01); *B62K 19/34* (2013.01); *B62M 9/131* (2013.01); *B62M 9/136* (2013.01); *B62M 9/1342* (2013.01)

(58) Field of Classification Search
CPC ...... B62M 9/135; B62M 9/136; B62M 9/134; B62M 9/1342; B62M 9/131; B62M 9/125; B62M 9/126; B62K 19/34
See application file for complete search history.

(56) References Cited

U.S. PATENT DOCUMENTS

| 4,330,137 | A |   | 5/1982  | Nagano |        |
|-----------|---|---|---------|--------|--------|
| 5,496,222 | A | * | 3/1996  | Kojima | ................ B62M 9/1342 |
|           |   |   |         |        | 474/80 |
| 5,728,018 | A | * | 3/1998  | Terada | ................ B62M 9/1344 |
|           |   |   |         |        | 474/127 |
| 5,846,148 | A | * | 12/1998 | Fujii  | .................... B62M 9/1344 |
|           |   |   |         |        | 474/80 |
| 6,612,950 | B2| * | 9/2003  | Nanko  | ................... B62M 9/135 |
|           |   |   |         |        | 474/80 |
| 7,867,118 | B2|   | 1/2011  | Yamamoto et al. | |
| 8,491,429 | B2| * | 7/2013  | Cranston | .................. B62J 13/00 |
|           |   |   |         |        | 280/304.3 |
| 9,249,867 | B2| * | 2/2016  | Graziosi | .................. B62M 9/16 |
| 9,327,786 | B2| * | 5/2016  | Cranston | .................. B62J 13/00 |

(Continued)

FOREIGN PATENT DOCUMENTS

JP          2965878 B2   10/1999

*Primary Examiner* — Michael R Mansen
*Assistant Examiner* — Raveen J Dias
(74) *Attorney, Agent, or Firm* — Global IP Counselors, LLP

(57) ABSTRACT

A bicycle front derailleur is provided that can be easily coupled to a bicycle frame. The bicycle front derailleur includes a base member, a chain guide and a link mechanism. The base member is configured to be coupled to a bottom bracket hanger of the bicycle frame. The chain guide is configured to guide a chain. The link mechanism connects the chain guide to the base member to move the chain guide between a retracted position and an extended position. The base member includes a recess configured to accommodate a part of the chain guide in a state where the chain guide is located at the retracted position.

26 Claims, 8 Drawing Sheets

(56) References Cited

U.S. PATENT DOCUMENTS

| | | | |
|---|---|---|---|
| 2006/0068955 A1* | 3/2006 | Oi | B62M 9/135 474/78 |
| 2009/0062049 A1 | 3/2009 | Cranston et al. | |
| 2010/0317475 A1* | 12/2010 | Talavasek | B62M 9/136 474/141 |
| 2013/0053196 A1* | 2/2013 | Emura | B62M 9/136 474/140 |
| 2014/0155204 A1* | 6/2014 | Emura | B62M 9/135 474/80 |
| 2014/0155205 A1* | 6/2014 | Kuwayama | B62M 9/1344 474/80 |
| 2015/0115568 A1 | 4/2015 | Emura et al. | |

* cited by examiner

BICYCLE FRONT DERAILLEUR

CROSS-REFERENCE TO RELATED APPLICATIONS

This application claims priority to Japanese Patent Application No. 2017-051602, filed on Mar. 16, 2017. The entire disclosure of Japanese Patent Application No. 2017-051602 is hereby incorporated herein by reference.

BACKGROUND

Field of the Invention

The present invention generally relates to a bicycle front derailleur.

Background Information

Various mounting structures are known for coupling a bicycle front derailleur to a frame of a bicycle. Examples of such mounting structures include a first coupling structure that couples a bicycle front derailleur to a coupling portion arranged integrally with a seat tube, and a second coupling structure that couples a bicycle front derailleur to a bicycle front derailleur coupling device coupled to a frame. Japanese Laid-Open Patent Publication No. 8-142970 (Patent document 1) discloses one example of a bicycle front derailleur coupling device having the second coupling structure.

SUMMARY

In the first coupling structure, the coupling portion is arranged on the seat tube. Thus, a person needs to perform the task for coupling the bicycle front derailleur in a region proximate to the seat tube. This task can be burdensome for the person. The second coupling structure requires the task for coupling a bicycle front derailleur coupling device to the frame and the task for coupling the bicycle front derailleur to the bicycle front derailleur coupling device. This task can also be burdensome for the person.

One object of the present invention is to provide a bicycle front derailleur that can be easily coupled to a frame of a bicycle.

In accordance with a first aspect of the present invention, a bicycle front derailleur includes a base member, a chain guide and a link mechanism. The base member is configured to be coupled to a bottom bracket hanger of a frame of a bicycle. The chain guide is configured to guide a chain. The link mechanism connects the chain guide to the base member to move the chain guide between a retracted position and an extended position. The base member includes a recess configured to accommodate a part of the chain guide in a state where the chain guide is located at the retracted position. The bicycle front derailleur according to the first aspect includes the base member coupled to the bottom bracket hanger and thus is easily coupled to the frame. Additionally, a part of the chain guide is accommodated in the recess of the base member. This limits contact of the chain guide with the base member.

In accordance with a second aspect of the present invention, a bicycle front derailleur includes a base member, a chain guide and a link mechanism. The base member is configured to be coupled to a bottom bracket hanger of a frame of a bicycle. The chain guide is configured to guide a chain. The link mechanism connects the chain guide to the base member to move the chain guide between a retracted position and an extended position. The link mechanism is configured so that the chain guide moves in a front-rear direction of the bicycle as the chain guide moves between the retracted position and the extended position in a state where the base member is coupled to the frame. The bicycle front derailleur according to the second aspect includes the base member coupled to the bottom bracket hanger and thus is easily coupled to the frame. Additionally, the chain guide moves in the front-rear direction of the bicycle. Thus, the height of the bicycle front derailleur can be lowered.

In accordance with a third aspect of the present invention, the bicycle front derailleur according to the first or second aspect is configured so that the base member includes a frame coupling portion including a first coupling opening into which a first bolt is inserted to couple the base member to the frame, and a link support portion pivotally supporting the link mechanism. With the bicycle front derailleur according to the third aspect, the link mechanism can be easily coupled to the frame by the first bolt.

In accordance with a fourth aspect of the present invention, the bicycle front derailleur according to the third aspect is configured so that the frame coupling portion is configured to partially extend around an axis of the bottom bracket hanger in a state where the base member is coupled to the frame. With the bicycle front derailleur according to the fourth aspect, the weight of the bicycle front derailleur can be reduced.

In accordance with a fifth aspect of the present invention, a bicycle front derailleur includes a base member, a chain guide and a link mechanism. The base member is configured to be coupled to a bottom bracket hanger of a frame of a bicycle. The chain guide is configured to guide a chain. The link mechanism connects the chain guide to the base member to move the chain guide between a retracted position and an extended position. The base member includes a frame coupling portion and a link support portion. The frame coupling portion includes a first coupling opening into which a first bolt is inserted to couple the base member to the frame. The link support portion movably supports the link mechanism. The frame coupling portion is configured to partially extend around an axis of the bottom bracket hanger in a state where the base member is coupled to the frame. The bicycle front derailleur according to the fifth aspect includes the base member coupled to the bottom bracket hanger and thus is easily coupled to the frame. Additionally, the base member is coupled to the frame by the bolt. Thus, the link mechanism is coupled to the frame by the base member. The frame coupling portion partially surrounds the axis of the bottom bracket hanger. This contributes to the weight reduction of the bicycle front derailleur.

In accordance with a sixth aspect of the present invention, the bicycle front derailleur according to any one of the third to fifth aspects is configured so that the frame coupling portion and the link support portion are formed integrally with each other. With the bicycle front derailleur according to the sixth aspect, the rigidity of the base member is increased. Additionally, the number of components of the bicycle front derailleur is decreased.

In accordance with a seventh aspect of the present invention, the bicycle front derailleur according to any one of the second to sixth aspects is configured so that the base member includes a recess configured to accommodate a part of the chain guide in a state where the chain guide is located at the retracted position. With the bicycle front derailleur according to the seventh aspect, contact of the base member with the chain guide is limited.

In accordance with an eighth aspect of the present invention, the bicycle front derailleur according to the first or seventh aspect is configured so that the chain guide includes an inner guide plate. The recess is configured to accommodate a part of the inner guide plate of the chain guide in a state where the base member is coupled to the frame. With the bicycle front derailleur according to the eighth aspect, contact of a portion of the inner guide plate with the base member is limited.

In accordance with a ninth aspect of the present invention, the bicycle front derailleur according to the eighth aspect is configured so that the inner guide plate of the chain guide includes a front end portion. The recess is configured to accommodate the front end portion of the inner guide plate of the chain guide in a state where the base member is coupled to the frame. With the bicycle front derailleur according to the ninth aspect, contact of the front end portion of the inner guide plate with the base member is limited.

In accordance with a tenth aspect of the present invention, the bicycle front derailleur according to any one of the third to sixth aspects is configured so that the base member includes a second coupling opening into which a second bolt is inserted to couple the base member to the frame. The first coupling opening and the second coupling opening extend around an axis of the bottom bracket hanger. The bicycle front derailleur according to the tenth aspect can be adjustably coupled about the axis of the bottom bracket hanger in a state where the base member is coupled to the frame.

In accordance with an eleventh aspect of the present invention, the bicycle front derailleur according to any one of the third to sixth aspects is configured so that the frame coupling portion is disposed at a front side of the bicycle with respect to an axis of the bottom bracket hanger in a state where the base member is coupled to the frame. With the bicycle front derailleur according to the eleventh aspect, the frame coupling portion is located at the front of the bottom bracket hanger. Thus, the base member is stably supported during an outward shifting. Consequently, the outward shifting is further assuredly performed.

In accordance with a twelfth aspect of the present invention, the bicycle front derailleur according to any one of the third to sixth and eleventh aspects is configured so that the frame coupling portion is at least partially arcuate. With the bicycle front derailleur according to the twelfth aspect, the frame coupling portion is configured in conformance with the shape of the bottom bracket hanger.

In accordance with a thirteenth aspect of the present invention, the bicycle front derailleur according to any one of the third to sixth, eleventh, and twelfth aspects is configured so that the link mechanism includes a first link and a second link located closer to the frame than the first link in a state where the base member is coupled to the frame. The link support portion includes a first link support portion pivotally supporting the first link and a second link support portion pivotally supporting the second link. At least one of the first link support portion and the second link support portion protrudes with respect to the frame coupling portion in an axial direction of the bottom bracket hanger in a state where the base member is coupled to the frame. With the bicycle front derailleur according to the thirteenth aspect, in a case where the bicycle front derailleur is coupled to the bottom bracket hanger, the rotation axes of the first link and the second link are nearly orthogonal to the ground. Thus, the bicycle front derailleur appropriately performs the side swing.

In accordance with a fourteenth aspect of the present invention, the bicycle front derailleur according to the thirteenth aspect is configured so that the first link support portion protrudes in a first direction of the axial direction extending away from the frame with respect to the frame coupling portion in a state where the base member is coupled to the frame. With the bicycle front derailleur according to the fourteenth aspect, the first link is arranged to protrude in the first direction with respect to the frame coupling portion.

In accordance with a fifteenth aspect of the present invention, the bicycle front derailleur according to the thirteenth or fourteenth aspect is configured so that the second link support portion protrudes in a second direction of the axial direction extending toward the frame with respect to the frame coupling portion in a state where the base member is coupled to the frame. With the bicycle front derailleur according to the fifteenth aspect, the second link is arranged to protrude in the second direction with respect to the frame coupling portion.

In accordance with a sixteenth aspect of the present invention, the bicycle front derailleur according to any one of the third to sixth and eleventh to fifteenth aspects is configured so that the base member includes a support member coupling portion coupling a support member to the base member so that the support member contacts the frame in a state where the base member is coupled to the frame. With the bicycle front derailleur according to the sixteenth aspect, in a case where the base member is coupled to the frame, the support member contacts the frame to restrict the bending. This stabilizes the position of the bicycle front derailleur and increases the shifting force of the bicycle front derailleur.

In accordance with a seventeenth aspect of the present invention, the bicycle front derailleur according to the sixteenth aspect is configured so that the support member coupling portion is located between the frame coupling portion and the link support portion. With the bicycle front derailleur according to the seventeenth aspect, the bending of the base member is restricted between the frame coupling portion and the link support portion.

In accordance with an eighteenth aspect of the present invention, the bicycle front derailleur according to the sixteenth or seventeenth aspect is configured so that the base member includes the support member coupling portion that includes a plurality of support member coupling portions. Even though the support member is coupled to the support member coupling portion, the shape of the frame could hinder the support member from contacting the frame. With the bicycle front derailleur according to the eighteenth aspect, the base member includes the plurality of support member coupling portions. This avoids a situation in which the support member is out of contact with the frame. The support member can be coupled to one of the support member coupling portions located at a position appropriate to the shape of the frame.

In accordance with a nineteenth aspect of the present invention, the bicycle front derailleur according to any one of the first to eighteenth aspects is configured so that the base member includes an outer casing holder configured to hold an outer casing of an operation cable that operates the chain guide in a state where the operation cable is coupled to the bicycle front derailleur. With the bicycle front derailleur according to the nineteenth aspect, the outer casing can extend to the outer casing holder. Consequently, the protected portion of the inner cable is extended.

In accordance with a twentieth aspect of the present invention, the bicycle front derailleur according to any one of the first to nineteenth aspects is configured so that the base member is adjustably coupled to the bottom bracket hanger about an axis of the bottom bracket hanger in a state where the base member is coupled to the frame. With the bicycle front derailleur according to the twentieth aspect, the position of the bicycle front derailleur can be adjusted.

In accordance with a twenty-first aspect of the present invention, the bicycle front derailleur according to any one of the fourth to sixth and eleventh to eighteenth aspects is configured so that the frame coupling portion includes a first end and a second end opposite to the first end in a circumferential direction of an axis of the bottom bracket hanger in a state where the base member is coupled to the frame, and an angle formed between the first end and the second end about the axis is greater than or equal to 100 degrees and less than or equal to 180 degrees. As the angle is increased, the rigidity of the bicycle front derailleur is increased. As the angle is decreased, the weight of the bicycle front derailleur can be reduced. In a case where the angle is greater than or equal to 100 degrees and less than or equal to 180, both the high rigidity and the weight reduction can be easily achieved.

The present invention provides a bicycle front derailleur that can be easily coupled to a frame of a bicycle.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

Figure 1:
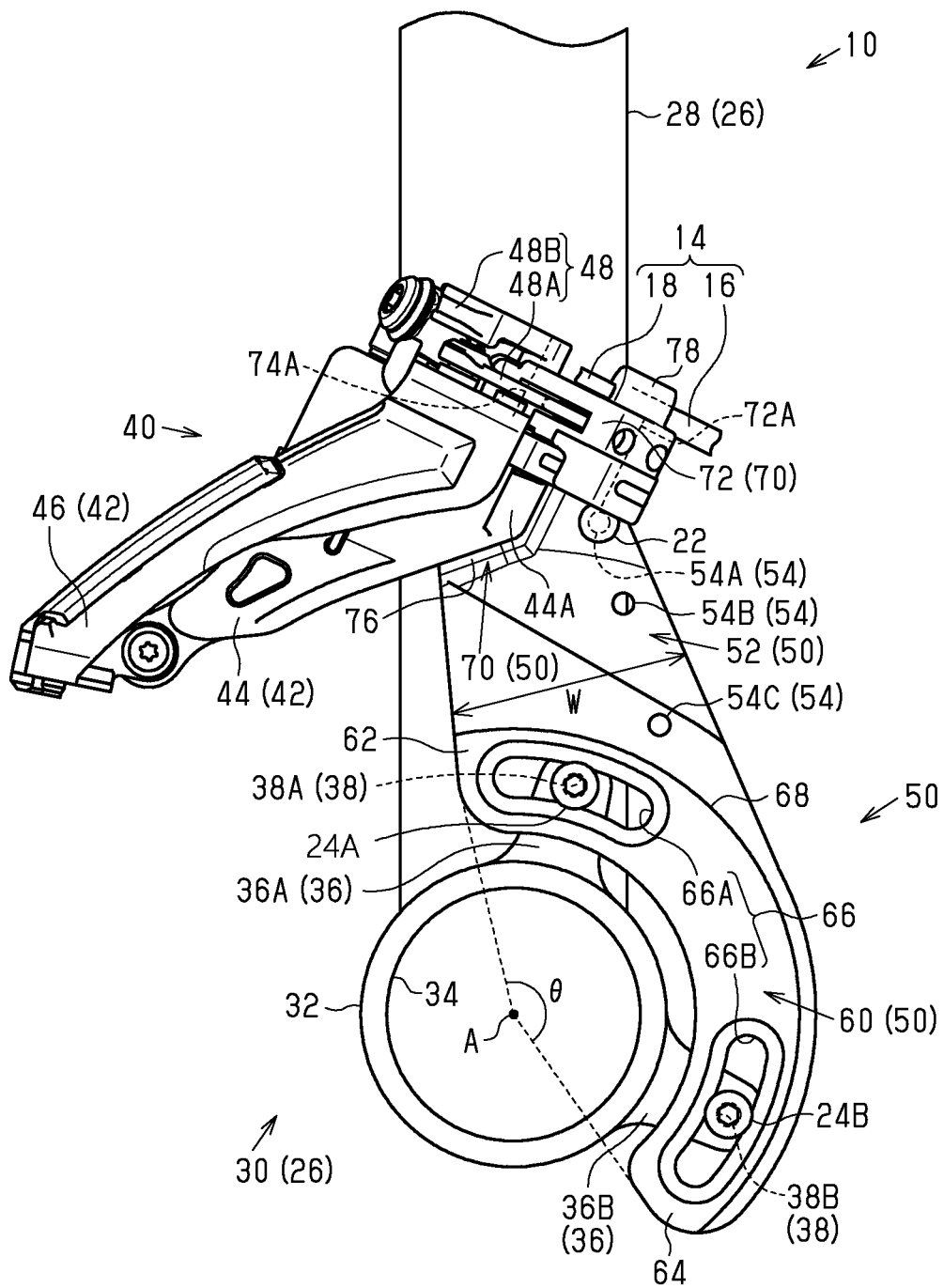
FIG. 1 is a side elevational view of a portion of a bicycle equipped with a bicycle front derailleur in accordance with a first embodiment.

FIG. 1 is a side elevational view of a portion of a bicycle 10 equipped with a bicycle front derailleur 40 in accordance with a first embodiment. The bicycle 10 includes a plurality of front sprockets 12 (refer to FIG. 3), an operation cable 14, a first bolt 24A, a second bolt 24B, a frame 26 and the bicycle front derailleur 40. The frame 26 includes a seat tube 28. The frame 26 includes a bottom bracket hanger 30.

The bottom bracket hanger 30 includes a body 32. The body 32 is tubular. The inner surface of the body 32 includes an internally threaded portion 34. In a state where a bottom bracket (not shown) is fastened to the internally threaded portion 34 of the body 32, the body 32 supports the bottom bracket.

The bottom bracket hanger 30 includes a support portion 36. The support portion 36 is a projection extending outward from the outer surface of the body 32 in the radial direction of the body 32. The support portion 36 includes one or more support portions. In the example shown in the drawings, the support portion 36 includes a first support portion 36A and a second support portion 36B. In another example, the support portion 36 includes only one of the first support portion 36A and the second support portion 36B. In another example, in addition to the first support portion 36A and the second support portion 36B, the support portion 36 further includes at least one further support portion.

The support portion 36 includes a pair of support holes 38. Each of the support holes 38 is defined by a wall surface including internal threads (not shown). The support holes 38 include a first support hole 38A and a second support hole 38B. The first support hole 38A is arranged in the first support portion 36A. The second support hole 38B is arranged in the second support portion 36B.

The bicycle front derailleur 40 includes a chain guide 42, a link mechanism 48 and a base member 50. The first bolt 24A and the second bolt 24B couple the base member 50 to the frame 26. The first bolt 24A is fastened to the first support hole 38A. The second bolt 24B is fastened to the second support hole 38B. Alternatively, the support holes 38 can each be a through hole having no internal threads. In such a case, the first bolt 24A and the second bolt 24B are coupled to nuts to fasten the base member 50 to the frame 26.

The bicycle front derailleur 40 is configured to perform a swing action. The swing type of the bicycle front derailleur 40 is, for example, a side swing, a top swing, or a down swing. As seen in FIG. 1, the bicycle front derailleur 40 is configured as a side swing-type bicycle front derailleur. The base member 50 is coupled to the bottom bracket hanger 30 of the frame 26 of the bicycle 10. The base member 50 includes a recess 76. In a preferred example, the base member 50 further includes a frame coupling portion 60 and a link support portion 70. In the example shown in the drawings, the frame coupling portion 60 is a portion of the base member 50 located toward one longitudinal end of the base member 50 from a step 68. The link support portion 70 is a portion of the base member 50 including the recess 76 and located toward the other longitudinal end. The base member 50 is formed from a material having a high rigidity. The material forming the base member 50 is, for example, a metal such as an aluminum alloy, stainless steel, or iron. Here, the frame coupling portion 60 and the link support portion 70 are integral formed as a one-piece member of a single material. Thus, in the first embodiment, the frame coupling portion 60 and the link support portion 70 are non-separable with respect to each other.

The frame coupling portion 60 is coupled to the bottom bracket hanger 30 of the frame 26. The frame coupling portion 60 is configured to partially extend around an axis A of the bottom bracket hanger 30. More specifically, the frame coupling portion 60 is configured to partially surround the axis A of the bottom bracket hanger 30. It is preferred that the frame coupling portion 60 be at least partially arcuate. Alternatively, the frame coupling portion 60 can be configured to surround the entire circumference of the axis A of the bottom bracket hanger 30.

The frame coupling portion 60 includes a first end 62 and a second end 64. The first and second ends 62 and 64 are circumferentially spaced apart in a circumferential direction surround the axis A of the bottom bracket hanger 30. The second end 64 is opposite to the first end 62. It is preferred that an angle θ formed between the first end 62 and the second end 64 about the axis A be greater than or equal to 100 degrees and less than or equal to 180 degrees. It is further preferred that the angle θ be greater than or equal to 150 degrees and less than or equal to 170 degrees.

The frame coupling portion 60 includes a pair of coupling openings 66. The coupling openings 66 are arranged at intervals in the circumferential direction of the axis A so that the frame coupling portion 60 can be coupled to the bottom bracket hanger 30 by the first bolt 24A and the like. While only two coupling openings are shown in the first embodiment, it will be apparent from this disclosure that the frame coupling portion 60 can include more than two coupling openings. In the example shown in the drawings, the frame coupling portion 60 includes a first coupling opening 66A. The frame coupling portion 60 also includes a second coupling opening 66B. The first coupling opening 66A is formed in the frame coupling portion 60 toward the first end 62. The second coupling opening 66B is formed in the frame coupling portion 60 toward the second end 64.

The first bolt 24A is configured to be inserted into the first coupling opening 66A to couple the base member 50 to the frame 26. The second bolt 24B is configured to be inserted into the second coupling opening 66B to couple the base member 50 to the frame 26. The first coupling opening 66A and the second coupling opening 66B extend circumferentially around the axis A of the bottom bracket hanger 30. Thus, the first coupling opening 66A and the second coupling opening 66B are each an elongated curved opening. In a state where the first bolt 24A and the second bolt 24B are inserted, a person can adjust the position of the base member 50 about the axis A of the bottom bracket hanger 30.

The shape of each coupling opening 66 can be changed to a different shape. For example, at least one of the coupling openings 66 can be formed so that the position of the base member 50 is not adjustable about the axis A of the bottom bracket hanger 30. This coupling opening 66 is referred to as the differently shaped coupling opening 66. In a case where at least one of the first coupling opening 66A and the second coupling opening 66B is the differently shaped coupling opening 66, the position of the base member 50 cannot be adjusted about the axis A of the bottom bracket hanger 30. The differently shaped coupling opening 66 includes, for example, a first example and a second example that are described below. In the first example, the differently shaped coupling opening 66 is an elongated opening extending in a direction other than the circumferential direction of the axis A. In the second example, the differently shaped coupling opening 66 is a circular hole.

The link support portion 70 pivotally supports the link mechanism 48. The frame coupling portion 60 and the link support portion 70 are formed integrally with each other. More specifically, the frame coupling portion 60 and the link support portion 70 cannot be separated from each other. In other words, the frame coupling portion 60 and the link support portion 70 cannot be separated from each other without breaking the base member 50. The process for integrally forming the link support portion 70 and the frame coupling portion 60 is, for example, an integral manufacturing, such as forging, or welding. The frame coupling portion 60 and the link support portion 70 are spaced apart from each other by an intermediate portion 52. The intermediate portion 52 interconnects the frame coupling portion 60 and the link support portion 70. Tin the first embodiment, the intermediate portion 52, the frame coupling portion 60 and the link support portion 70 cannot be separated from each other, and are integrally formed as a single piece. The chain guide 42 is movably coupled to the base member 50. The chain guide 42 guides a chain 20. The chain guide 42 includes an inner guide plate 44 and an outer guide plate 46. In a state where the bicycle front derailleur 40 is coupled to the frame 26, the inner guide plate 44 is located closer to the frame 26 than the outer guide plate 46. The frame coupling portion 60 and the link support portion 70 can be formed separately from each other.

The operation cable 14 operates the chain guide 42. The operation cable 14 is, for example, a Bowden cable. The operation cable 14 includes an outer casing 16 and an inner cable 18. The inner cable 18 is pulled inside the outer casing 16 by an operating device (not shown) that is typically mounted on a handlebar (not shown) of the bicycle 10 to operate the bicycle front derailleur 40. When the inner cable 18 is pulled by the operating device (not shown), the chain guide 42 is moved with respect to the base member 50 in a direction away from the frame 26. When the inner cable 18 is loosened, the chain guide 42 is moved with respect to the base member 50 in a direction toward the frame 26.

Figure 2:
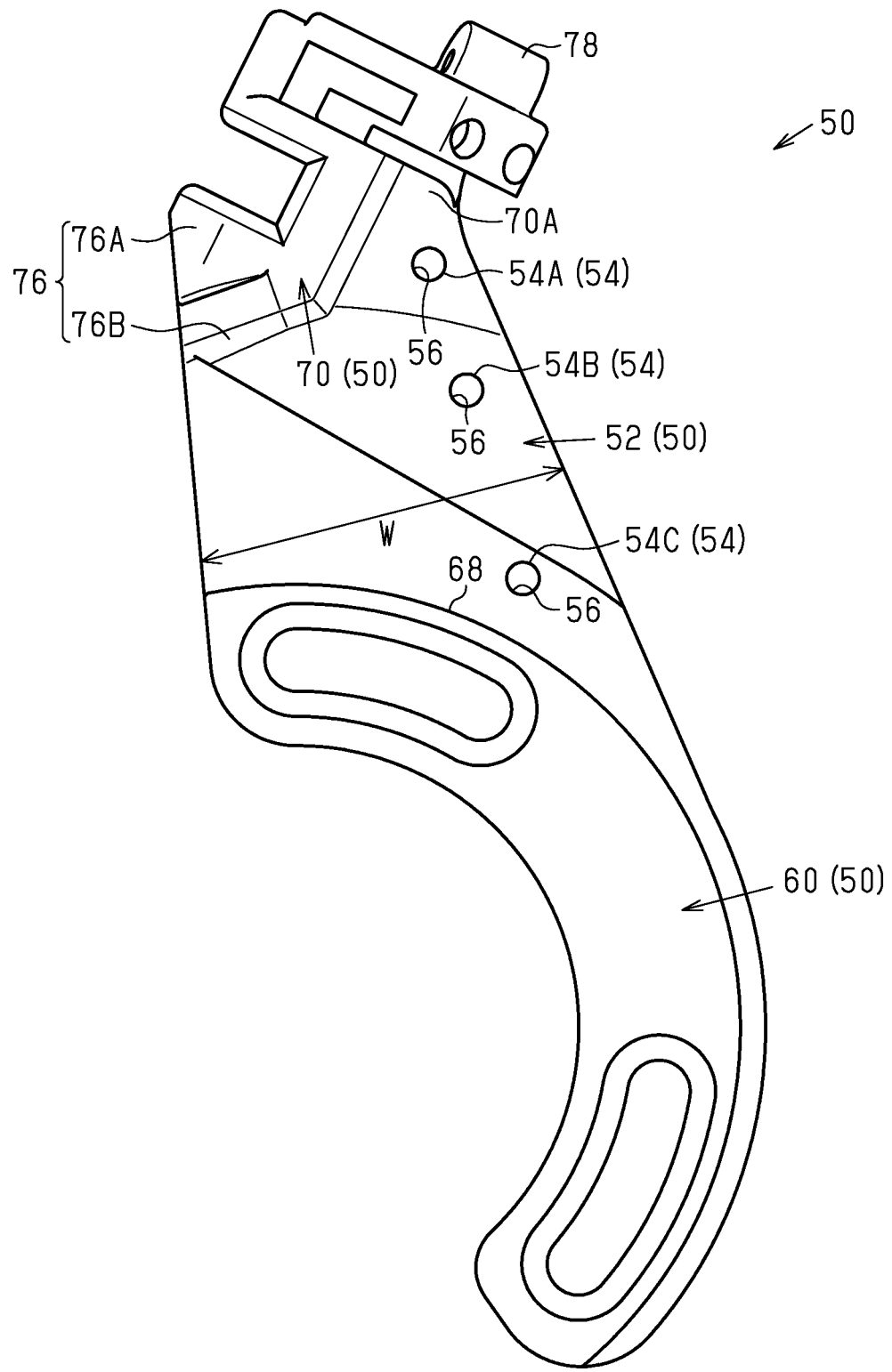
FIG. 2 is a side elevational view of a base member of the bicycle front derailleur shown in FIG. 1.

As shown in FIG. 2, the intermediate portion 52 is located between the frame coupling portion 60 and the link support portion 70. The intermediate portion 52 is formed to have a dimension W in the lateral direction of the base member 50 that is decreased from the frame coupling portion 60 toward the link support portion 70.

The base member 50 includes one or more support member coupling portions 54. In a preferred example, the support member coupling portions 54 are arranged between the frame coupling portion 60 and the link support portion 70. More specifically, the support member coupling portions 54 are arranged on the intermediate portion 52. The support member coupling portions 54 include, for example, holes 56 extending through the intermediate portion 52. The holes 56 are internally threaded (not shown). The support member coupling portions 54 include a first support member coupling portion 54A, a second support member coupling portion 54B, and a third support member coupling portion 54C.

As seen in FIG. 2, the recess 76 is defined by a bottom wall 76A and a side wall 76B. The recess 76 is formed in the link support portion 70. In a further example, the recess 76 is formed over the link support portion 70 and the intermediate portion 52.

The base member 50 includes an outer casing holder 78 that holds the outer casing 16. The outer casing holder 78 is located, for example, on the link support portion 70. The outer casing holder 78 can hold an end of the outer casing 16. The outer casing 16 covers the inner cable 18 between the operating device and the outer casing holder 78. Since the bicycle front derailleur 40 includes the outer casing holder 78, the outer casing 16 can extend to the outer casing holder 78. Consequently, the protected portion of the inner cable 18 is extended.

Figure 3:
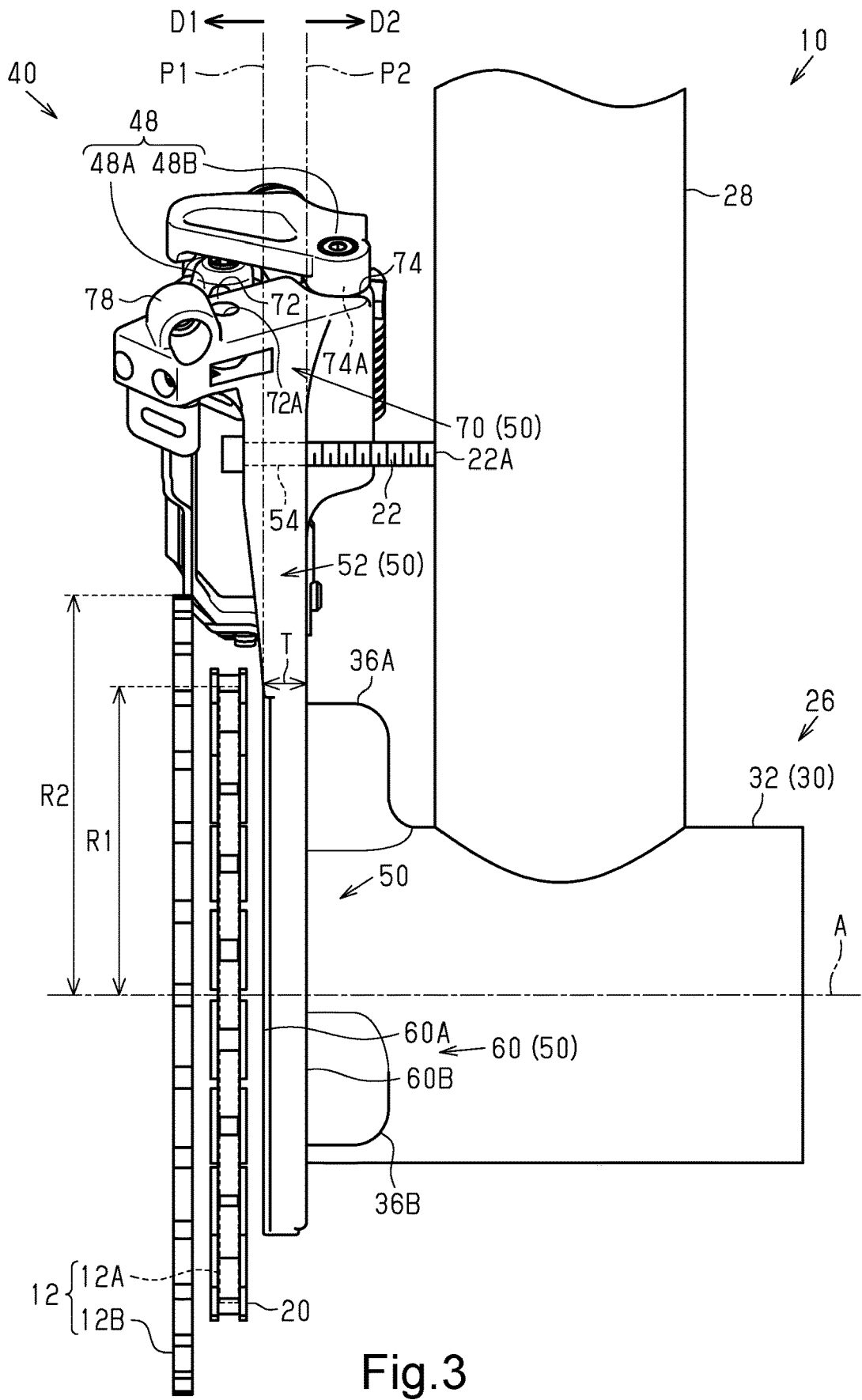
FIG. 3 is a front end elevational view of the bicycle front derailleur shown in FIG. 1 as seen from a view looking at the front end of the bicycle.

As shown in FIG. 3, the front sprockets 12 includes a first front sprocket 12A having a radius R1 and a second front sprocket 12B having a radius R2. The radius R2 of the second front sprocket 12B is larger than the radius R1 of the first front sprocket 12A.

The intermediate portion 52 is configured to have a thickness T that is increased from the frame coupling portion 60 toward the link support portion 70 as seen in FIG. 3. In a case where the chain guide 42 is moved, a larger force tends to be applied to the link support portion 70 than the frame coupling portion 60. Therefore, the intermediate portion 52 is configured to increase the thickness T of portions receiving the larger force.

The link mechanism 48 pivotally connects the chain guide 42 (refer to FIG. 1) to the base member 50 between a retracted position and an extended position. The link mechanism 48 includes a first link 48A and a second link 48B. The second link 48B is located closer to the frame 26 than the first link 48A. Thus, the second link 48B is located closer to the seat tube 28 than the first link 48A.

The retracted position is the position of the chain guide 42 where the chain 20 runs on the first front sprocket 12A. The extended position is the position of the chain guide 42 where the chain 20 runs on the second front sprocket 12B. FIG. 3 shows the state where the chain guide 42 is located at the retracted position.

The link support portion 70 includes a first link support portion 72 and a second link support portion 74. The first link support portion 72 pivotally supports the first link 48A. The second link support portion 74 pivotally supports the second link 48B.

At least one of the first link support portion 72 and the second link support portion 74 protrudes with respect to the frame coupling portion 60 in a direction of the axis A of the bottom bracket hanger 30. For example, in a state where the base member 50 is coupled to the frame 26, the first link support portion 72 protrudes in a first direction D1 of the axis A of the bottom bracket hanger 30 extending away from the frame 26 with respect to the frame coupling portion 60. It is preferred that the first link support portion 72 protrudes in the first direction D1 with respect to an imaginary reference plane P1, which extends a surface 60A of the frame coupling portion 60 that is located farther from the frame 26 toward the link support portion 70.

In a state where the base member 50 is coupled to the frame 26, the second link support portion 74 protrudes in a second direction D2 of the axis A of the bottom bracket hanger 30 extending toward the frame 26 with respect to the frame coupling portion 60. It is preferred that the second link support portion 74 protrudes in the second direction D2 with respect to an imaginary plane P2, which extends a surface 60B of the frame coupling portion 60 that is located closer to the frame 26 toward the link support portion 70.

The first link support portion 72 has a first link support axis 72A. The second link support portion 74 has a second link support axis 74A. The first link 48A rotates about the first link support axis 72A. The second link 48B rotates about the second link support axis 74A. The first link support axis 72A and the second link support axis 74A are orthogonal or nearly orthogonal to the ground. Thus, in a state where the base member 50 is coupled to the frame 26, the link mechanism 48 is configured so that the chain guide 42 moves in a front-rear direction of the bicycle 10 in accordance with the movement between the retracted position and the extended position. The extended position is located toward the front of the bicycle 10 with respect to the retracted position. As the bicycle front derailleur 40 is viewed in a direction extending along the axis A of the bottom bracket hanger 30 (refer to FIG. 1), at least one of the first link support axis 72A and the second link support axis 74A can be configured to be inclined from the longitudinal direction of the seat tube 28 toward the front or rear of the bicycle 10. In the example shown in FIG. 1, each of the support axes 72A and 74A is inclined from the longitudinal direction of the seat tube 28 toward the front of the bicycle 10. In a preferred example, the angle of each of the support axes 72A and 74A inclined from the longitudinal direction of the seat tube 28 toward the front or rear of the bicycle 10 is greater than or equal to zero degrees and less than or equal to forty degrees.

A support member 22 is, for example, a bolt. The support member 22 is inserted into the first support member coupling portion 54A of the intermediate portion 52. In a state where the base member 50 is coupled to the frame 26, the support member 22 is in contact with the frame 26. For example, a distal portion 22A of the support member 22 is in contact with the seat tube 28 to restrict bending of the base member 50.

It is preferred that the support member coupling portions 54 be located at a position close to the link support portion 70. In the case of such a structure, the bending is restricted at the position close to the link support portion 70. This further increases the force of the chain guide 42 pushing the chain 20. The support member 22 only needs to be a member that restricts the bending of the base member 50. In another example, the support member 22 is a projection arranged integrally with or separately from the base member 50. The support member coupling portions 54 are the portions where the projection is arranged.

As shown in FIG. 2, in a state where the chain guide 42 is located at the retracted position, the recess 76 is configured to accommodate a part of the chain guide 42. In the state where the chain guide 42 is located at the retracted position, the inner guide plate 44 is located in the vicinity of the bottom wall 76A of the recess 76. This limits interference and contact of the base member 50 with the chain guide 42.

It is preferred that in a state where the chain guide 42 is located at the retracted position, the recess 76 be configured to accommodate a part of the inner guide plate 44 of the chain guide 42. In the case of such a configuration, as shown in FIG. 1, the recess 76 partially overlaps the chain guide 42 as viewed in the direction of the axis A of the bottom bracket hanger 30.

It is preferred that in a state where the chain guide 42 is located at the retracted position, the recess 76 be configured to accommodate a front end portion 44A of the inner guide plate 44 of the chain guide 42.

Figure 4:
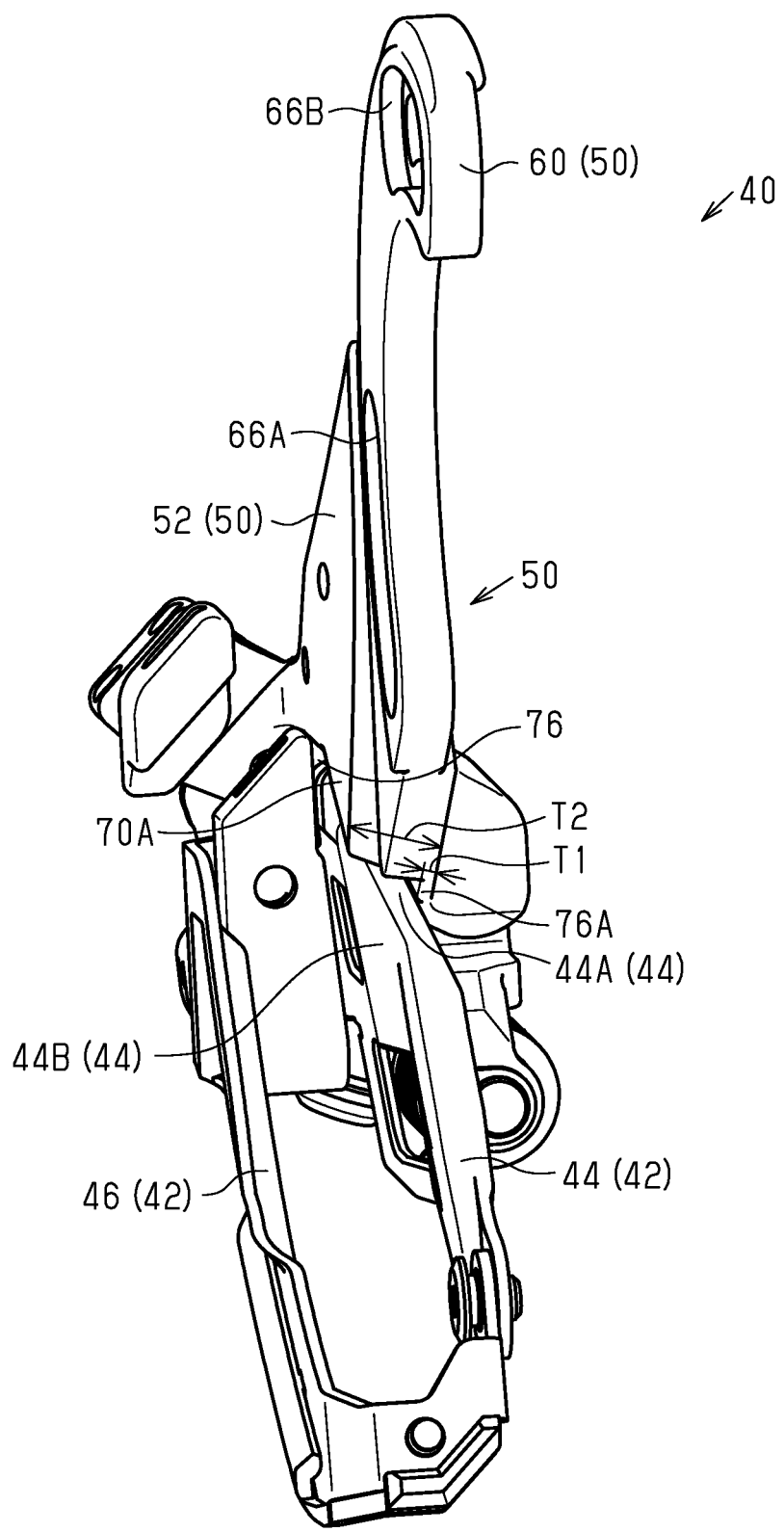
FIG. 4 is a bottom perspective view of the bicycle front derailleur shown in FIG. 1 as seen from a lower side of the bicycle.

FIG. 4 is a bottom perspective view of the bicycle front derailleur 40 with the frame 26 omitted as seen from a lower side of the bicycle 10. The inner guide plate 44 includes a first surface 44B. The first surface 44B is a surface of the inner guide plate 44 opposite to the frame 26. The first surface 44B is located closer to the frame 26 than the recess 76. Thus, a portion of the inner guide plate 44 is completely accommodated in the recess 76. The inner guide plate 44 can be configured to be accommodated in a state projecting from the recess 76. The rigidity of the base member 50 can be improved by setting a thickness T2 of a portion 70A extending around the recess 76 to be greater than a thickness T1 of the bottom wall 76A of the recess 76.

The procedures of the task for coupling the bicycle front derailleur 40 to the bottom bracket hanger 30 will now be described with reference to FIGS. 1 and 3. First, the bicycle front derailleur 40 is located at a side of the bottom bracket hanger 30 where the front sprockets 12 are located. In a state where the base member 50 is coupled to the frame 26, the direction of the bicycle front derailleur 40 is set so that the frame coupling portion 60 is disposed at the front side of the bicycle 10 with respect to the axis A of the bottom bracket hanger 30.

Then, the positions of the coupling openings 66 of the frame coupling portion 60 are aligned with the positions of the support holes 38 of the support portion 36 so that the first bolt 24A and the second bolt 24B can be inserted. The first bolt 24A is inserted into the first support hole 38A and the first coupling opening 66A. The second bolt 24B is inserted into the second support hole 38B and the second coupling opening 66B. The bolts 24A and 24B can be inserted in any order. The first coupling opening 66A and the second coupling opening 66B extend in the circumferential direction of the axis A of the bottom bracket hanger 30. Thus, the base member 50 is adjustably coupled to the bottom bracket hanger 30 about the axis A of the bottom bracket hanger 30.

The bolts 24A and 24B are fastened to an extent where the base member 50 is temporarily coupled to the support portion 36. The position of the chain guide 42 is adjusted about the axis A of the bottom bracket hanger 30. Consequently, the bolts 24A and 24B are firmly fastened so that the base member 50 is fastened to the support portion 36. The support member 22 is inserted into one of the holes 56 of the support member coupling portions 54. The support member 22 is fastened to the intermediate portion 52 until the distal portion 22A of the support member 22 comes into contact with the seat tube 28. The support member 22 does not necessarily have to be coupled to the base member 50.

Second Embodiment

Referring now to FIGS. 5 to 8, a bicycle front derailleur 140 in accordance with a second embodiment will be discussed. The bicycle front derailleur 140 of the second embodiment differs from the bicycle front derailleur 40 of the first embodiment in that a base member 80 has a different shape from the base member 50 of the first embodiment. Also, in view of this change in the base member 80, the bicycle 10 is provided with a modified bottom bracket hanger 130. In particular, the bottom bracket hanger 130 has further includes a third support portion 36C as part of the support portion 36. Otherwise, the bicycle front derailleur 140 of the second embodiment has substantially the same structure as t the bicycle front derailleur 40 of the first embodiment. Thus, the part that are the same will be given the same reference symbol.

Figure 5:
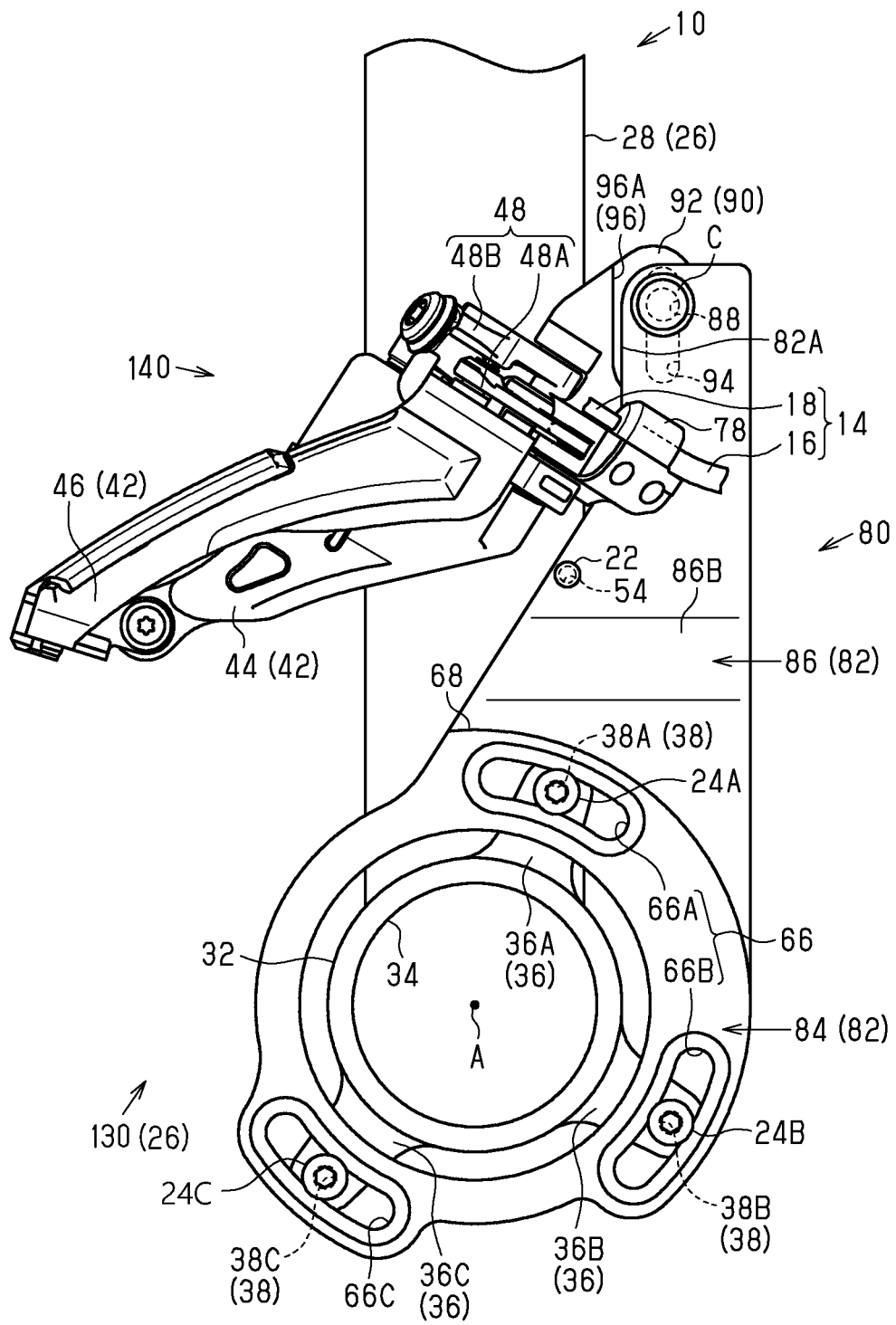
FIG. 5 is a side elevational view of a portion of a bicycle equipped with a bicycle front derailleur in accordance with a second embodiment.

As shown in FIG. 5, the third support portion 36C includes a third support hole 38C. A third bolt 24C is fastened to the third support hole 38C. The base member 80 includes a first base member 82 and a second base member 90. The first base member 82 is configured to be separate from the second base member 90. The first base member 82 includes a frame coupling portion 84 and an intermediate portion 86. The second base member 90 includes a link support portion 92.

The frame coupling portion 84 is annular and inserted into the body 32 of the bottom bracket hanger 130. The coupling openings 66 further include a third coupling opening 66C. The third bolt 24C is inserted into the third coupling opening 66C. The annular shape of the frame coupling portion 84 provides increased the rigidity as compared to the frame coupling portion 60 of the first embodiment.

In a state where the first base member 82 is coupled to the bottom bracket hanger 130, the intermediate portion 86 is located above the frame coupling portion 84. The intermediate portion 86 includes a first connection opening 88. A connection bolt C is inserted into the first connection opening 88.

Figure 6:
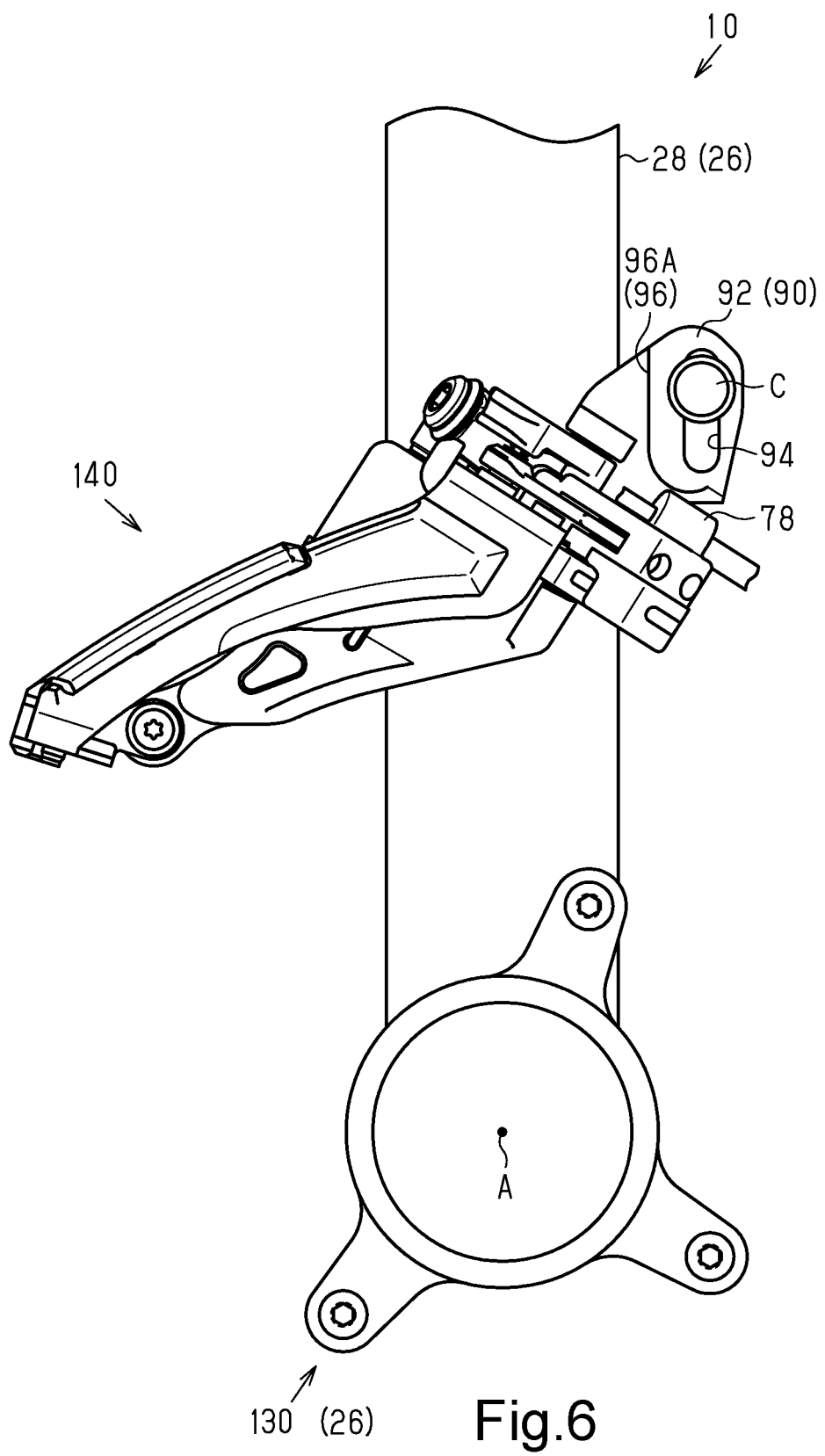
FIG. 6 is a side elevational view of the bicycle front derailleur shown in FIG. 5 but in a where the first base member is omitted from FIG. 5.

As shown in FIG. 6, the link support portion 92 includes a second connection opening 94. The second connection opening 94 is, for example, an elongated hole. The connection bolt C is inserted into the second connection opening 94. The connection bolt C is fastened to a nut N (refer to FIG. 7). The connection bolt C and the nut N restrict relative movement and rotation of the first base member 82 and the second base member 90.

The second base member 90 includes a restriction portion 96. The restriction portion 96 is arranged to further restrict the rotation of the second base member 90 relative to the first base member 82 in a state where the first base member 82 and the second base member 90 are connected to each other. One example of the restriction portion 96 is a step 96A, which is sunken from the link support portion 92 of the second base member 90. The relative rotation of the first base member 82 and the second base member 90 is restricted by contact of the step 96A of the restriction portion 96 with an edge 82A (refer to FIG. 5) of the first base member 82. The restriction portion 96 can be arranged in the first base member 82. The restriction portion 96 is, for example, a step that is sunken from the intermediate portion 86 of the first base member 82.

Figure 7:
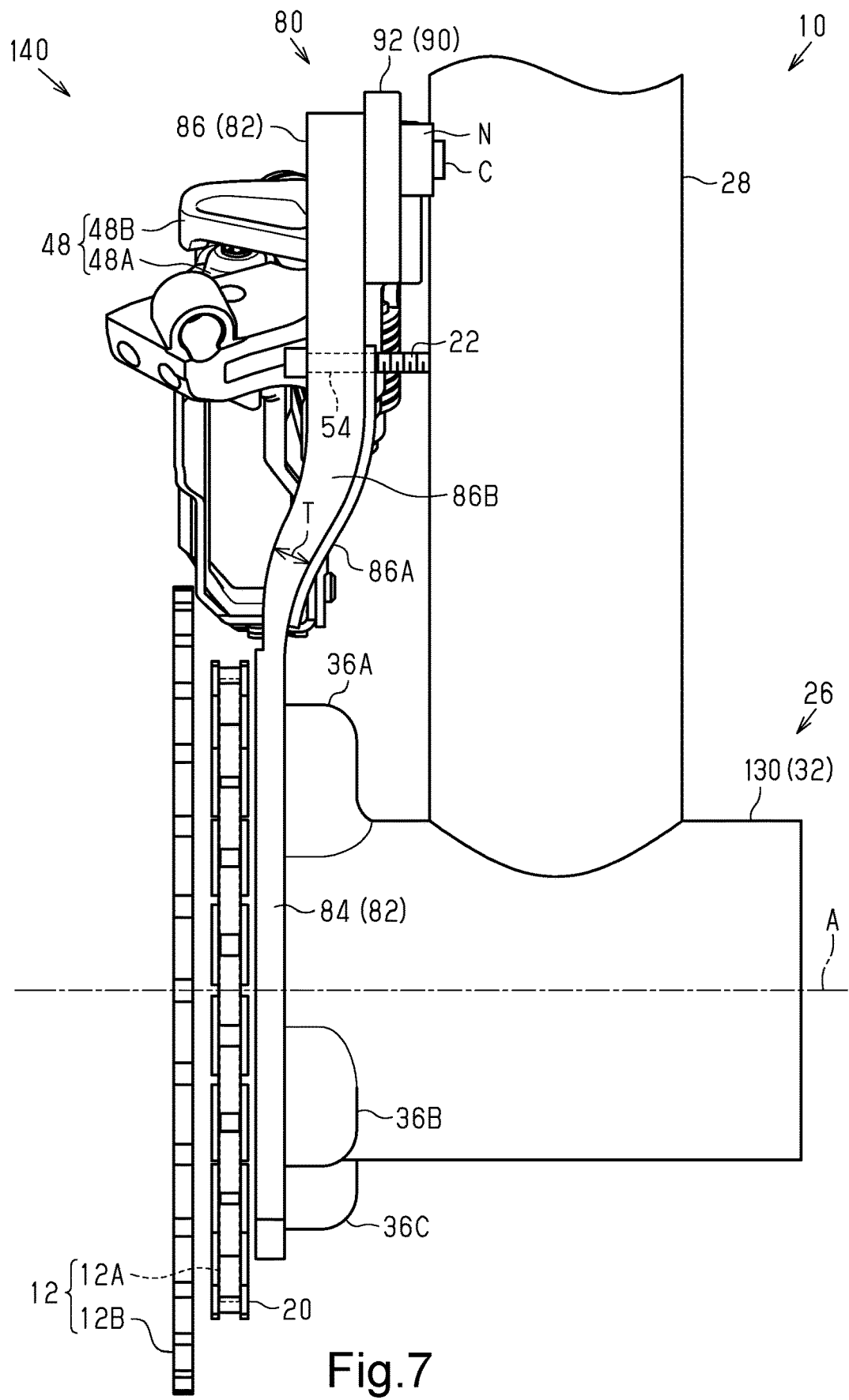
FIG. 7 is a front end elevational view of the bicycle front derailleur shown in FIG. 5 as seen from a view looking at the front end of the bicycle.

As shown in FIG. 7, the intermediate portion 86 includes an inclined part 86B. The inclined part 86B extends outward from the center side of the bicycle 10 in the direction extending along the axis A of the bottom bracket hanger 130 as the inclined part 86B extends from an upper side to a lower side of the bicycle 10. The inclined part 86B is arranged to adjust the position of the chain guide 42 in the sideward direction of the bicycle 10.

Figure 8:
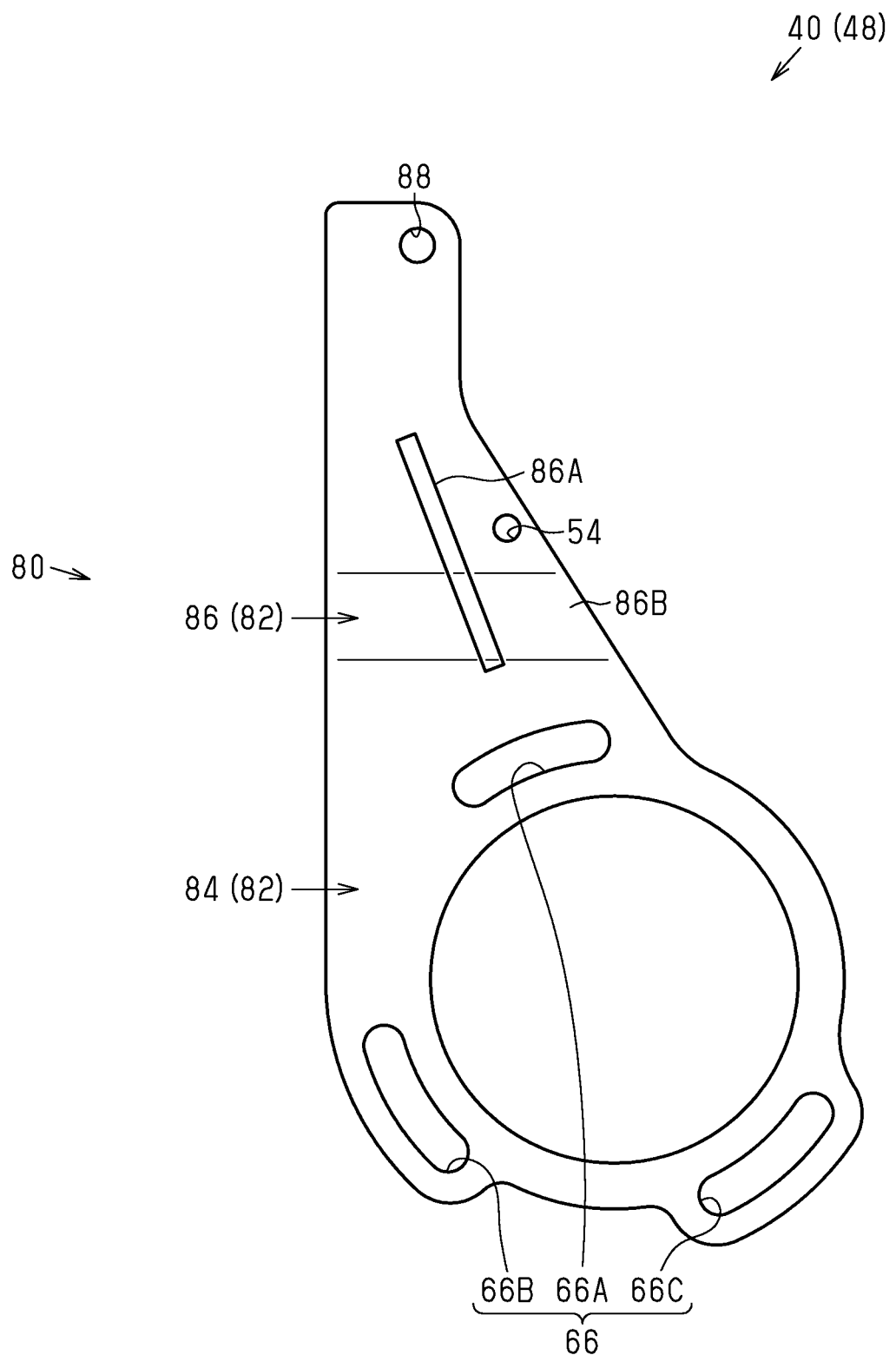
FIG. 8 is a frame facing side elevational view of the first base member shown in FIG. 5.

As shown in FIG. 8, the intermediate portion 86 includes a reinforcement rib 86A. The reinforcement rib 86A, for example, extends from the frame coupling portion 84 toward the first connection opening 88. The arrangement of the reinforcement rib 86A on the intermediate portion 86 further increases the rigidity of the first base member 82. The reinforcement rib 86A can be changed to any location. In a first example, the reinforcement rib 86A is arranged on the link support portion 92. In a second example, the reinforcement rib 86A is arranged on the frame coupling portion 84.

If the fastening of the connection bolt C and the nut N is loosened in a state where the first base member 82 and the second base member 90 are connected to each other, then the second base member 90, which includes the elongated second connection opening 94, becomes movable in the vertical direction with respect to the frame coupling portion 84. Thus, the position of the chain guide 42 can be adjusted in the vertical direction. In a state where the position of the chain guide 42 is adjusted in the vertical direction, the fastening of the connection bolt C to the nut N fixes the base member 80.

Modifications

The above description illustrates the embodiments of a bicycle front derailleur according to the present invention and thus is not intended to be restrictive. Each of the embodiments of the bicycle front derailleur according to the present invention can be modified as follows. Further, the modifications can be combined.

The base member 50 can be changed to any structure. In a further example, the base member 50 does not include the recess 76.

What is claimed is:

1. A bicycle front derailleur comprising:
   a base member made of a rigid material and configured to be coupled to a bottom bracket hanger of a frame of a bicycle;
   a chain guide configured to guide a chain; and
   a link mechanism connecting the chain guide to the base member to move the chain guide along a direction toward and away from the frame between a retracted position and an extended position,
   the base member including a recess at a portion of the base member disposed between the chain guide and the frame in the direction toward and away from the frame in a state where the base member is coupled to the frame, the recess including a bottom wall that is made of the rigid material and disposed between the chain guide and the frame in the direction toward and away from the frame such that the chain guide overlaps the bottom wall when viewed along a direction parallel to an axis of the bottom bracket hanger in the state where the base member is coupled to the frame, the recess being configured to accommodate a part of the chain guide in a state where the chain guide is located at the retracted position.

2. The bicycle front derailleur according to claim 1, wherein
   the base member includes
   a frame coupling portion including a first coupling opening into which a first bolt is inserted to couple the base member to the frame, and
   a link support portion pivotally supporting the link mechanism.

3. The bicycle front derailleur according to claim 2, wherein
   the frame coupling portion is configured to partially extend around the axis of the bottom bracket hanger in the state where the base member is coupled to the frame.

4. The bicycle front derailleur according to claim 3, wherein
   the frame coupling portion includes a first end and a second end opposite to the first end in a circumferential direction of the axis of the bottom bracket hanger in the state where the base member is coupled to the frame, and
   an angle formed between the first end and the second end about the axis is greater than or equal to 100 degrees and less than or equal to 180 degrees.

5. The bicycle front derailleur according to claim 2, wherein
   the frame coupling portion includes a second coupling opening into which a second bolt is inserted to couple the base member to the frame, and
   the first coupling opening and the second coupling opening extend around the axis of the bottom bracket hanger in the state where the base member is coupled to the frame.

6. The bicycle front derailleur according to claim 2, wherein
   the frame coupling portion is disposed at a front side of the bicycle with respect to the axis of the bottom bracket hanger in the state where the base member is coupled to the frame.

7. The bicycle front derailleur according to claim 2, wherein
   the frame coupling portion is at least partially arcuate.

8. The bicycle front derailleur according to claim 2, wherein
   the link mechanism includes a first link and a second link located closer to the frame than the first link in the state where the base member is coupled to the frame,
   the link support portion includes a first link support portion pivotally supporting the first link and a second link support portion pivotally supporting the second link, and
   at least one of the first link support portion and the second link support portion protrudes with respect to the frame coupling portion in an axial direction of the bottom bracket hanger in the state where the base member is coupled to the frame.

9. The bicycle front derailleur according to claim 8, wherein
   the first link support portion protrudes in a first direction of the axial direction extending away from the frame with respect to the frame coupling portion in the state where the base member is coupled to the frame.

10. The bicycle front derailleur according to claim 8, wherein
    the second link support portion protrudes in a second direction of the axial direction extending toward the frame with respect to the frame coupling portion in the state where the base member is coupled to the frame.

11. The bicycle front derailleur according to claim 2, wherein
    the base member includes a support member coupling portion coupling a support member to the base member so that the support member contacts the frame in the state where the base member is coupled to the frame.

12. The bicycle front derailleur according to claim 11, wherein
    the support member coupling portion is located between the frame coupling portion and the link support portion.

13. The bicycle front derailleur according to claim 11, wherein
    the base member includes the support member coupling portion that includes a plurality of support member coupling portions.

14. The bicycle front derailleur according to claim 1, wherein
    the chain guide includes an inner guide plate, and
    the recess is configured to accommodate a part of the inner guide plate of the chain guide in the state where the chain guide is located at the retracted position.

15. The bicycle front derailleur according to claim 14, wherein
    the inner guide plate of the chain guide includes a front end portion, and
    the recess is configured to accommodate the front end portion of the inner guide plate of the chain guide in the state where the chain guide is located at the retracted position.

16. The bicycle front derailleur according to claim 1, wherein
    the base member includes an outer casing holder configured to hold an outer casing of an operation cable that operates the chain guide in a state where the operation cable is coupled to the bicycle front derailleur.

17. The bicycle front derailleur according to claim 1, wherein
    the base member is adjustably coupled to the bottom bracket hanger about the axis of the bottom bracket hanger in the state where the base member is coupled to the frame.

18. The bicycle front derailleur according to claim 1, wherein
the base member includes a frame coupling portion and a link support portion, the frame coupling portion being configured to be coupled to the bottom bracket hanger, and the link support portion movably supporting the link mechanism, and
the recess is disposed on the link support portion at an end of the base member opposite from the frame coupling portion.

19. The bicycle front derailleur according to claim 1, wherein
the recess further includes a side wall at least partially surrounding the bottom wall.

20. The bicycle front derailleur according to claim 19, wherein
the base member is a plate-like member and a thickness direction of the base member is oriented in the in the direction toward and away from the frame in the state where the base member is coupled to the frame,
a thickness of the base member at a portion extending around the recess is larger than a thickness the bottom wall.

21. A bicycle front derailleur comprising:
a base member configured to be coupled to a bottom bracket hanger of a frame of a bicycle;
a chain guide configured to guide a chain; and
a link mechanism connecting the chain guide to the base member to move the chain guide between a retracted position and an extended position,
the link mechanism being configured so that the chain guide moves in a front-rear direction of the bicycle as the chain guide moves along a direction toward and away from the frame between the retracted position and the extended position in a state where the base member is coupled to the frame.

22. The bicycle front derailleur according to claim 21, wherein
the base member includes a recess configured to accommodate a part of the chain guide in a state where the chain guide is located at the retracted position.

23. The bicycle front derailleur according to claim 21, wherein
the extended position of the chain guide is located toward the front of the bicycle with respect to the retracted position of the chain guide in the state where the base member is coupled to the frame.

24. A bicycle front derailleur comprising:
a base member configured to be coupled to a bottom bracket hanger of a frame of a bicycle;
a chain guide configured to guide a chain; and
a link mechanism connecting the chain guide to the base member to move the chain guide along a direction toward and away from the frame between a retracted position and an extended position,
the base member including a frame coupling portion and a link support portion,
the frame coupling portion including a first coupling opening into which a first bolt is inserted to couple the base member to the frame,
the link support portion movably supporting the link mechanism,
the frame coupling portion being configured to partially extend around an axis of the bottom bracket hanger in a state where the base member is coupled to the frame, and
the frame coupling portion including a first end and a second end opposite the first end, the first end and the second end being spaced apart from each other in a first circumferential direction and connected to each other in a second circumferential direction different from the first circumferential direction, the first and second circumferential directions being centered on the axis of the bottom bracket hanger in the state where the base member is coupled to the frame.

25. The bicycle front derailleur according to claim 24, wherein
the frame coupling portion and the link support portion are formed integrally with each other.

26. The bicycle front derailleur according to claim 24, wherein
an angle formed between the first end and the second end about the axis is greater than or equal to 100 degrees and less than or equal to 180 degrees.

* * * * *